(12) United States Patent
Jensen et al.

(10) Patent No.: US 8,660,595 B2
(45) Date of Patent: Feb. 25, 2014

(54) COMMUNICATION ARRANGEMENT FOR TRANSMISSION OF COMMUNICATION SIGNALS ALONG A PIPE LINE

(75) Inventors: Irene Anite Jensen, Trondheim (NO); Knut Harald Grythe, Trondheim (NO)

(73) Assignee: Sinvent AS, Trondheim (NO)

( * ) Notice: Subject to any disclaimer, the term of this patent is extended or adjusted under 35 U.S.C. 154(b) by 248 days.

(21) Appl. No.: 13/264,235

(22) PCT Filed: Apr. 16, 2010

(86) PCT No.: PCT/NO2010/000139
§ 371 (c)(1),
(2), (4) Date: Jan. 3, 2012

(87) PCT Pub. No.: WO2010/120187
PCT Pub. Date: Oct. 21, 2010

(65) Prior Publication Data
US 2012/0094701 A1    Apr. 19, 2012

(30) Foreign Application Priority Data
Apr. 16, 2009  (NO) .................................. 20091476

(51) Int. Cl.
H04B 7/00    (2006.01)
H04B 7/24    (2006.01)
G01V 3/00    (2006.01)
(52) U.S. Cl.
USPC ........................... 455/500; 455/39; 340/854.4
(58) Field of Classification Search
USPC ..................................................... 340/854.4
See application file for complete search history.

(56) References Cited

U.S. PATENT DOCUMENTS

| 6,515,592 B1* | 2/2003 | Babour et al. ............. 340/854.4 |
| 8,289,173 B2* | 10/2012 | Ben-Mansour et al. ...... 340/605 |
| 2005/0024231 A1* | 2/2005 | Fincher et al. ............. 340/854.4 |
| 2010/0286791 A1* | 11/2010 | Goldsmith ................... 623/23.7 |
| 2011/0227721 A1* | 9/2011 | Mezghani et al. ......... 340/539.1 |

FOREIGN PATENT DOCUMENTS

| GB | 2184581 A | 6/1987 |
| WO | 02/071643 A1 | 9/2002 |
| WO | 2007/137326 A1 | 12/2007 |

OTHER PUBLICATIONS

Norwegian Office Action for Application No. 20091476, Nov. 16, 2009 (3 p.).
Norwegian Search Report for Application No. 20091476, Nov. 16, 2009 (2 p.).
PCT/NO2010/000139 International Search Report, Jun. 8, 2010 (3 p.).

* cited by examiner

*Primary Examiner* — Andrew Wendell
*Assistant Examiner* — Maryam Soltanzadeh
(74) *Attorney, Agent, or Firm* — Conley Rose, P.C.

(57) ABSTRACT

It is disclosed a communication arrangement for transmission of communication signals along a pipe line where the communication arrangement comprises: a pipe with outer pipe walls made of a conductive material, a non conductivity coating surrounding said pipe where the coating has dielectric properties, an outer coating/layer or fluid that has conductive properties which encapsulates the non conductivity coating, and at least one radio frequency transmitter and one radio frequency receiver configured to transmit electromagnetic fields in the coating.

11 Claims, 1 Drawing Sheet

COMMUNICATION ARRANGEMENT FOR TRANSMISSION OF COMMUNICATION SIGNALS ALONG A PIPE LINE

CROSS-REFERENCE TO RELATED APPLICATIONS

This application is a 35 U.S.C. §371 national stage application of PCT/NO2010/000139 filed Apr. 16, 2010, which claims the benefit of Norwegian Application No. 20091476 filed Apr. 16, 2009, both of which are incorporated herein by reference in their entireties for all purposes.

STATEMENT REGARDING FEDERALLY SPONSORED RESEARCH OR DEVELOPMENT

Not applicable.

TECHNICAL FIELD

The present invention relates to a communication arrangement for transmission of communication signals along a pipe line.

BACKGROUND ART

Operation of drilling processes offshore, control of pipelines offshore or onshore requires real-time information about conditions, being downhole, along a pipeline or between two installations along a pipe line. Information regarding a pipelines' own status, regarding a remote status, regarding a downhole status or commands from a remote location to a downhole location, from an onshore location to an offshore location all needs communication paths for transfer of data. New and more sophisticated drilling techniques require an increased bandwidth for communicating telemetry signals in real-time from downhole to surface stations. The industry standard for these kinds of transmission is mud pulse telemetry that uses the drill pipe to guide acoustic waves in the drilling fluid; this technique will typically render bit rates in the sub 10 bit/sec. Such slow rates is incapable of transmitting a large amount of data in real-time. Acoustic telemetry through drill pipes have been studied with bit rates in sub 100 bit/sec.

A number of conventional systems have a wire in the drill pipes; however these systems suffer from poor reliability and high cost due to a large number of electrical connectors.

Current coupled inductive couplers in drill pipes are known and have been tested out. Such transformer cable connecting systems have also been tested for transmission of data along pipelines both onshore and offshore.

However none of the methods indicated above provides a system that in a reliable fashion can transfer data at a high bit rate along a pipeline either being onshore or offshore.

From the patent literature there are known methods that overcome some of the drawbacks indicated above. GB 2 184 581 A discloses a shut off valve control system for an oil or gas platform, where the valve is operated by command signals from a control station transmitted on a guided micro-wave carrier via a pipe.

It is further known from WO 02/071643 A1 a communication device for transmitting signals between a substation control unit and a control unit of bay elements comprising transceiver devices connected to the substation and the bay element control units and a wave guide enclosing and connecting antennas of said transceiver devices. The transceiver devices produce electromagnetic radio frequency airwaves to communicate information between the control units. The disclosed solution is not particularly well suited for offshore use as water is not a good medium for transmitting high frequency electromagnetic waves.

Another example of communication arrangement along a pipeline is disclosed in U.S. Pat. No. 6,515,592 B1 (Babour et al.). This invention is directed to power and signal transmission using insulated conduit. In one embodiment it is shown a sandwich solution in which an electrical current path is defined by a casing encapsulated by an insulator with a conductive layer for return of electrical current in a layer surrounding said insulator. The conductor-insulator-conductor configuration maintains the traditional signal loop of a feed and return path.

Yet another example of a communication system is disclosed in US 2005/0024231 A1 (Fincher et. al). This document proposes a system in which a conductive pipe receives a solid insulator layer on the interior running along the pipe and a suitable reflective shield forming an inner surface of the insulator layer. This sandwich configuration employs RF signals in the insulator layer.

Hence, according to one aspect of the invention it is provided an arrangement which in a secure fashion transmits data for automation, control or monitoring along a pipeline at a much higher bit rate than known from prior art indicated above.

DISCLOSURE OF INVENTION

The drawbacks indicated above is met by communication arrangement for transmission of communication signals along a pipe line where the communication arrangement comprises:

a pipe with outer pipe walls made of a conductive material, a non conductivity coating surrounding said pipe, an outer coating/layer or fluid that has conductive properties which encapsulates the non conductivity coating, and at least one radio frequency transmitter configured to excite an electro magnetic field in the non conductive coating where the non conductivity coating has dielectric properties and the field being associated with data signals and one radio frequency receiver configured to receive data signals in form of electromagnetic fields in the dielectric non conductivity coating.

It is further according to the present invention disclosed a communication arrangement where the non conductive coating is made of a polymer containing material.

In another aspect according to the present invention it is disclosed a communication arrangement where the communication arrangement further comprises at each end of the pipe radio frequency transceivers.

In yet an embodiment according to the present invention it is proposed a communication arrangement where the communication arrangement further comprises at least one intermediate radio transceiver.

Still another embodiment discloses a communication arrangement where the transceivers and/or transmitters communicate in a multi hop fashion employing electromagnetic fields in the dielectric coating.

In still another embodiment it is disclosed a communication arrangement where the communication arrangement further comprises at least one intermediate node, where the node comprises a radio transceiver, an antenna and an adjacent power supply.

In still another embodiment it is disclosed that the power supply is at least one of: batteries, generators, sea water batteries or sea water generators.

In still another embodiment it is disclosed a communication arrangement where the at least one intermediate node, is embedded in the non conductivity coating.

In yet an embodiment it is disclosed a communication arrangement where the at least one intermediate node is configured to exchange data through an interface with external data communication devices using electromagnetic field as a data carrier.

Another aspect according to the present invention discloses an arrangement for communication employing any combination of the arrangements indicated above.

Further advantageous aspects according to the present invention will be apparent from the accompanying dependent claims.

BRIEF DESCRIPTION OF DRAWINGS

To make the following description more readily understandable the following discussion will make reference to the accompanying drawings in which.

MODE(S) FOR CARRYING OUT THE INVENTION

Figure 1:
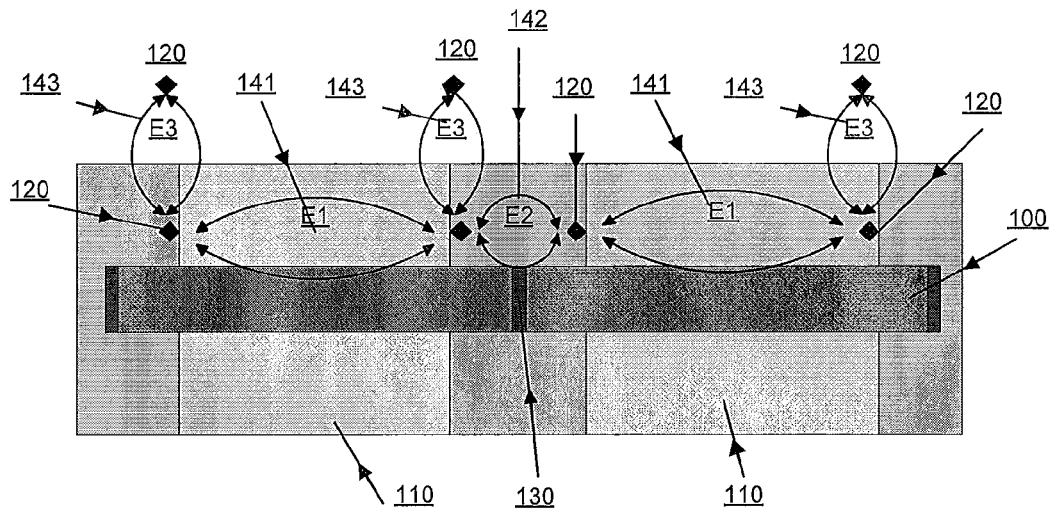
FIG. 1 illustrates three alternative EM field paths and implementations
Figure 2:
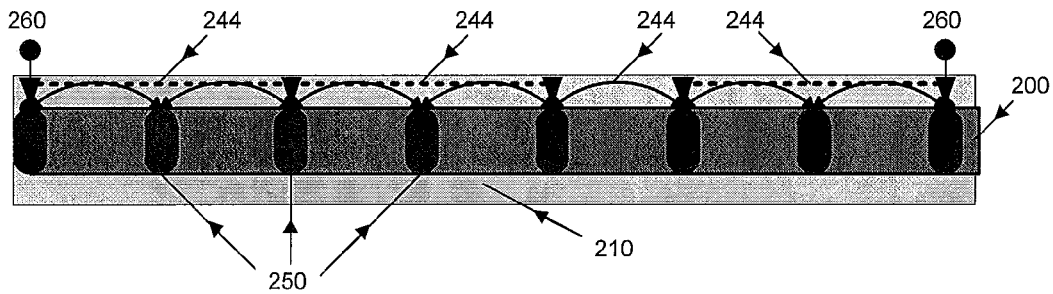
FIG. 2 shows a pipe with EM-field communications along the pipe inside a coating in a multi-hop fashion.

The invention will now be described with reference to the accompanying drawings, which are not to scale, however it shall be understood that the drawings are only meant to facilitate the understanding of the invention and they are in no way limiting the scope of the claimed invention.

In the following the wording modem and node may be used interchangeably, as to the mentioning of power supply any power supply known to the person skilled in the art shall be included in the interpretation of batteries, generators etc.

The present invention provides a robust, low-loss means for transmitting data along a pipeline 100, 200, 300. It provides fast and reliable communications paths along pipelines, either on-shore or off-shore. The basic principle and most obvious advantage will be best understood and appreciated in off-shore installations where pipe-lines are immersed in sea water, hence immersed in a fluid having conductive characteristics. Contrary to the traditional solutions of using traditional wired communication paths, pulse telemetry, acoustic telemetry through drill pipes or current coupled inductive couplers the present invention relies on a more sophisticated and up to date solution of using electro magnetic fields as employed in radio communication.

The basic principle according to the present invention is to use wave guide technique where the transmission medium is a coating medium 110, 210, 310 enveloping a pipe line 100, 200, 300, the wave guide medium shall have permeability and permittivity which is tailored for transmission of electro magnetic field. The conductivity of the surrounding sea water may work as the outer guide 311 of the electro magnetic fields 141, whereas the pipe line 100, 200, 300 provides an inner guide for the electro-magnetic fields, hence rendering a wave guide for electro magnetic fields in said coating medium 110, 210, 310. On shore solutions will necessitate an outer shielding 311 having a conductivity that enhances the wave guide function of the coating medium 110, 210, 310, i.e. the propagating medium.

In off shore installations it will be crucial that the power requirement is kept as low as possible while still maintaining the required robustness.

In principle one will have two end nodes 120 one at each end of the pipeline 100, 200, 300. These end nodes will be transceivers which in transmitting mode will excite an electro magnetic field in the propagating medium i.e. the coating 110, 210, 310. Between these end nodes 120 one will normally have a number of relay nodes 120 where the number is dependent on the length of the pipeline; these relay nodes 120 will be connected to antennas preferably encapsulated in the coating 110, 210, 310. The relay nodes need 120 to be energized preferably by local power supplies. The power supplies may be batteries embedded in the relay nodes or integrated in the coating 110, 210, 310. One may also use sea water batteries or generators which are arranged adjacent to the relay nodes 120 or any combination of the power supply solutions indicated. The low power requirement ensures a stable and reliable supply of power throughout the lifespan of the pipe line 100, 200, 300.

As the power requirement shall be held at a minimum, at least for offshore installations, this will put some restrictions on the choice of frequency and communication protocol to be used.

Reference is now made to an exemplary embodiment as indicated in FIG. 1 where three alternative electromagnetic-field (EM-field) paths are denominated E1 141, E2 142 and E3 143. In this example they are all short range solutions.

The EM-field E3 143 supports a near field solution for external data communication as exemplified in FIG. 1 , but not limited to the end node. Hence intermediate nodes 120 along the pipe 100, 200, 300 according to the present invention may exchange data through an interface with external data communication devices using EM-field as a data carrier.

The EM-field E1 141 is propagating in the coating 110, 210, 310 between the outer pipe steel wall 370 and the conducting salty sea water 311 outside the coating 110, 210, 310. The coating 110, 210, 310 can be poly propylene as indicated in the figure or any other coating material that have the right characteristics. The coating 110, 210, 310 has given values of permeability and permittivity which influences on the behaviour of the EM-field and its propagation in the coating 110, 210, 310.

In one test embodiment of the present invention the length of the propagation channel between radio frequency (RF) modems 120 i.e. relay nodes is set to 12 or 24 meters, the distance is only an example and shall by no mean be understood as a limiting example.

E1 141 is propagating along the pipe 100, 200, 300 even if the pipe is bent due to e.g. snaking. Typically expected signal power attenuation is found from simulations. For the 12 and 24 meters solution, very little transmitter power is necessary (<1 mW) depending upon the information rate and carrier frequency.

Figure 3:
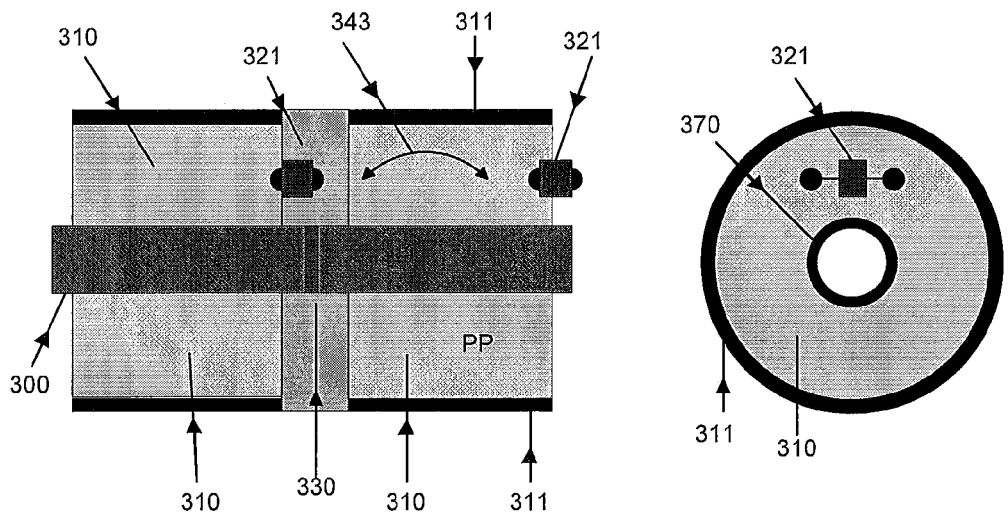
FIG. 3 illustrates a radio transceiver inside the coating.

According to one aspect of an offshore embodiment the idea behind the application of an electromagnetic field within the pipe is to consider the propagation of the field in the space between the sea water 311 and the pipe steel surface 370. This is indicated in FIG. 3.

The radio 321 excites an electromagnetic field 343 within the indicated space between the sea water and the pipe steel surface. This is used for propagating information between neighbour transceivers/nodes/modems 120, 321. Access protocols can be any proprietary protocol or any established protocol known from radio communication, from telecommunication or data communication. However preferred protocols will have the characteristics of being very bit effective hence having low rate of redundant or idle bits. Furthermore the protocol shall preferably fulfil the criteria of low power consumption as indicated above.

According to one example the access protocol is CSMA, CSMA Carrier sense multiple access solution, but the requirements on the low energy consumption within this unit may call for a more dedicated solution or another standard that consumes little energy and has good communication efficiency.

The carrier frequency and bandwidths are here subject to free design, but it must meet the constraints set by the propagation channel.

In the above different embodiments have been disclosed, however these embodiments are only exemplary and the person skilled in the art will appreciate that any embodiment using the principle of an electro magnetic propagating medium 110, 210, 310 encapsulating a conductive pipe 100, 200, 300 with an outer shielding 370 that is conductive shall be within the scope of protection as defined by the appended claims.

Reference Numerals to the Drawings
100 Pipe
110 A non conductive coating such as PP with dielectric properties
120 RF-modem
130 Weld girth
141 Electromagnetic field, E1
142 Electromagnetic field, E2
143 Electromagnetic field, E3
200 Pipe
210 A non conductive coating such as PP with dielectric properties
244 Multi hop EM-field connections
250 Sensor clamp
300 Pipe
310 A non conductive coating such as PP with dielectric properties
311 Outer coating/layer or fluid with conductive properties
321 Radio transceiver
330 Weld girth
343 Electromagnetic field
370 Outer pipe wall

The invention claimed is:

1. A communication arrangement for transmission of communication signals along a pipe line, where the communication arrangement comprises:
   a pipe with outer pipe walls made of a conductive material;
   a non conductivity coating surrounding said pipe;
   an outer coating/layer or fluid that has conductive properties which encapsulates the non conductivity coating;
   at least one radio frequency transmitter configured to excite an electro magnetic field in the non conductive coating where the non conductivity coating has dielectric properties and the field being associated with data signals; and
   one radio frequency receiver configured to receive data signals in form of electromagnetic fields in the dielectric non conductivity coating.

2. A communication arrangement according to claim 1, wherein the non conductivity coating is made of a polymer containing material.

3. A communication arrangement according to claim 1, wherein the pipe comprises radio frequency transceivers at each end.

4. A communication arrangement according to claim 3, further comprising at least one intermediate radio transceiver.

5. A communication arrangement according to claim 3, wherein the transceivers and/or transmitters communicate in a multi hop fashion employing electromagnetic fields in the dielectric non conductivity coating.

6. A communication arrangement according to claim 1, further comprising at least one intermediate node, where the node comprises a radio transceiver, an antenna, and an adjacent power supply.

7. A communication arrangement according to claim 6, wherein the intermediate node is configured to exchange data through an interface with external data communication devices using electromagnetic field as a data carrier.

8. A communication arrangement according to claim 6, wherein the power supply is at least one of batteries, generators, sea water batteries, or sea water generators.

9. A communication arrangement according to claim 6, wherein the at least one intermediate node is embedded in the non conductivity coating.

10. A communication arrangement according to claim 2, wherein the pipe comprises radio frequency transceivers at each end.

11. A communication arrangement according to claim 4, further comprising at least one intermediate radio transceiver.

* * * * *

UNITED STATES PATENT AND TRADEMARK OFFICE
CERTIFICATE OF CORRECTION

PATENT NO. : 8,660,595 B2  Page 1 of 1
APPLICATION NO. : 13/264235
DATED : February 25, 2014
INVENTOR(S) : Jensen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 324 days.

Signed and Sealed this

Twenty-ninth Day of September, 2015

Michelle K. Lee
*Director of the United States Patent and Trademark Office*